310-10 SR SEARCH ROOM
FIP8502 OR 3,405,290

SUPERCONDUCTING GENERATOR

Filed July 21, 1965

5 Sheets-Sheet 1

INVENTOR,
EDWARD HALAS

BY Harry M. Saragovitz
Edward J. Kelly
Herbert Berl
John W. Petect, Jr.
ATTORNEYS Oct. 8, 1968 E. HALAS 3,405,290

SUPERCONDUCTING GENERATOR

Filed July 21, 1965 5 Sheets-Sheet 2

INVENTOR,
EDWARD HALAS

BY Harry M. Saragovitz
Edward J. Kelly
Herbert Berl
John W. Pateet, Jr.
ATTORNEYS Oct. 8, 1968 E. HALAS 3,405,290

SUPERCONDUCTING GENERATOR

Filed July 21, 1965 5 Sheets-Sheet 3

INVENTOR,
EDWARD HALAS

Harry M. Saragovitz
Edward J. Kelly
Herbert Berl
John W. Poteet, Jr.
ATTORNEYS

INVENTOR,
EDWARD HALAS
BY Harry M. Saragovitz
Edward J. Kelly
Herbert Berl
John W. Poteet, Jr.
ATTORNEYS

INVENTOR,
EDWARD HALAS

BY Harry M. Saragovitz
Edward J. Kelly
Herbert Berl
John W. Pottert, Jr.
ATTORNEYS United States Patent Office 3,405,290
Patented Oct. 8, 1968

3,405,290
SUPERCONDUCTING GENERATOR

Edward Halas, 186 Hope St.,
Woodbridge, Va. 22191

Filed July 21, 1965, Ser. No. 473,877
4 Claims. (Cl. 310—10)

ABSTRACT OF THE DISCLOSURE

This invention is directed to a superconducting generator making use of the isolation of the superconducting elements at cryogenic temperatures while the rotor operates at ambient temperature. A substantial saving in weight and volume is accomplished by the use of superconducting coils. For example, a 1-million watt superconducting generator including its refrigeration unit, would be only 1/3 the weight of a conventional electric generator with similar output.

The invention described herein may be manufactured and used by or for the Government of the United States of America for governmental purposes without the payment to me of any royalties thereon.

This invention relates to cryogenic devices and, more specifically, a superconducting generator.

Broadly, this invention utilizes superconducting wires or superconducting thin films such as are more fully disclosed in my co-pending application Ser. No. 418,357, filed Dec. 14, 1964, for "Thin Film Superconductor Coil."

Conventional generators are composed of combinations of high permeability magnetic materials for the magnetic circuit, and the magnetomotive force is supplied by electric current passing through copper wire coils in the field position of the generator. The alternating current power is generated in the conventional copper armature coils rotating through the magnetic field. The alternating current power is drawn either by slip rings and current collectors from a rotating armature or another way has been to rotate the magnetic field and supply the field power requirements through two slip rings.

In the conventional state of the art, there are also brushless generators, such as the Stanley inductor generator. The brushless generators have a disadvantage as compared to generators which utilize slip rings since they must be driven at twice the speed for the same power output. The generators utilizing slip rings have a relatively high power density which has been developed to the point where only marginal improvements could be made. These marginal improvements were generally not worth the effort and so the state of the art in generators had virtually come to a standstill.

It would have appeared that superconducting coils could be applied to obtain advancements in electrical engineering practice and thus enable improvements in power generators. However, this has not been achievable although superconductivity has been known since 1911. There were obstacles which prevented this from taking place. The first serious obstacle was that the early superconducting materials did not have good enough electric and magnetic properties to allow utilization in strong magnetic field applications. When superconducting materials were used in field structure for experimental purposes, the results were disappointing because the superconductors were driven "normal" while attaining only modest magnetic fields and currents. This laboratory occurrence was very disillusioning and the dreams of practical electrical engineering applications for superconducting coils were shattered. More than fifty years of failures of experiments with practical applications of superconducting coils was sufficient to justify the widespread belief that practical applications of superconducting coils to electrical apparatus were theoretical and unobtainable. The invention of practical superconducting coils, such as thin film coils, and the invention of this generator were sufficient to dispel the old pessimism.

The solution of a practical configuration of a generator required novel structure inasmuch as there is very little resemblance to conventional generators. First, the phenomena of superconductivity takes place in liquid helium in which the superconducting coils must be immersed.

Although it would have been convenient to immerse all parts of a generator in liquid helium, this is not practical because of the extensive heat dissipation due to alternator windage. There are large orders of magnitude drag losses which cause large quantities of helium to boil away. Consequently, the process of rotating the field or armature structure in helium was very undesirable from an efficiency point of view. Accordingly, this disclosure is directed to a generator, the stationary superconducting field of which immersed in liquid helium and of which the rotating armature moves in ambient air environment.

This invention makes use of a magnetic field or source of magneomotive force from a stationary superconducting field. The superconducting field may be of a Helmholtz-pair construction. It could be any configuration which utilizes the combination of a stationary superconducting field and normal conductor armature rotating in the external air. The normal conductor armature can be of a three-phase or single-phase construction.

A contribution of this generator is that it can generate alternating current power from an electrical apparatus at a much higher power density than could be achieved with conventional generators at the same speed and with the similar number of poles.

Another contribution of this invention is afforded by the fact that the magnetomotive force of the superconducting coils are so strong that it is possible to design generators without magnetic steels in the magnetic circuit. As a result, the generator can be lighter in weight and smaller in volume.

Because the rotating portion of this invention rotates in free air, there are no drag losses or large liquid helium boil-offs. This generator has a much greater efficiency than can be obtained by a superconducting generator which is completely immersed and, therefore, which must rotate in liquid helium.

The wave shape of the voltage of the alternating current windings is not influenced by saturation characteristics of the magnetic circuit with the result that the harmonic content can be relatively low. Further, the field does not have $I^2R$ power losses because there is no resistance during superconductivity and thereby a much larger efficiency is possible.

The thermal insulating means, or Dewars, are transportable and will hold a considerable amount of liquid helium and liquid nitrogen to keep the superconducting coil superconducting. It is possible and practical to refill the Dewar at regular intervals to enable the generator to operate continuously.

This invention uses nonmagnetic materials in the magnetic circuit. This is made possible by an exceptionally strong magnetic field passing through an air or vacuum space to the armature windings. The armature structure is nonmagnetic material, such as glass fiber reinforced epoxy material, since conventional materials are high permeability materials. This removes the limit imposed by the saturation of a magnetic material. Magnetic materials may be used in certain portions of the circuit for specific purposes. The superconducting coils of this invention are superconducting wires or thin films, such as of niobium zirconium wire or niobium tin tape.

It is, therefore, a feature of this invention to provide a superconducting generator.

Another feature of this invention is to provide a superconducting generator having a high power density output.

Still another feature of this invention is to provide a lighter-in-weight and smaller-in-size generator.

Yet another feature of this invention is to provide a superconducting generator in which there is a minimum of boil-off of liquid helium.

A feature of this invention is to provide a superconducting generator utilizing niobium zirconium wire in the field windings.

Another feature of this invention is to provide a superconducting generator utilizing niobium tin thin film coils for the field windings.

Still another feature of this invention is to provide a superconducting generator in which only the superconducting coils or windings are immersed in liquid helium.

Yet another feature of this invention is to provide a superconducting generator which does not require magnetic steels in the magnetic circuit.

A feature of this invention is to provide a superconducting generator in which the harmonic content of the alternating currents is minimal.

Another feature of this invention is to provide a superconducting generator which does not have $I^2R$ losses in the field.

Still another feature of this invention is to provide a superconducting generator which can readily be refilled with liquid helium to operate continuously.

Yet another feature of this invention is to provide a superconducting generator in which the armature structure is on non-magnetic material to remove limit imposed by saturation of a magnetic material.

A feature is that normal wires are utilized in the armature at ambient temperatures.

The exact nature of this invention as well as other objects and advantages thereof will be readily apparent from consideration of the following specification relating to the annexed drawing in which.

Figure 1:
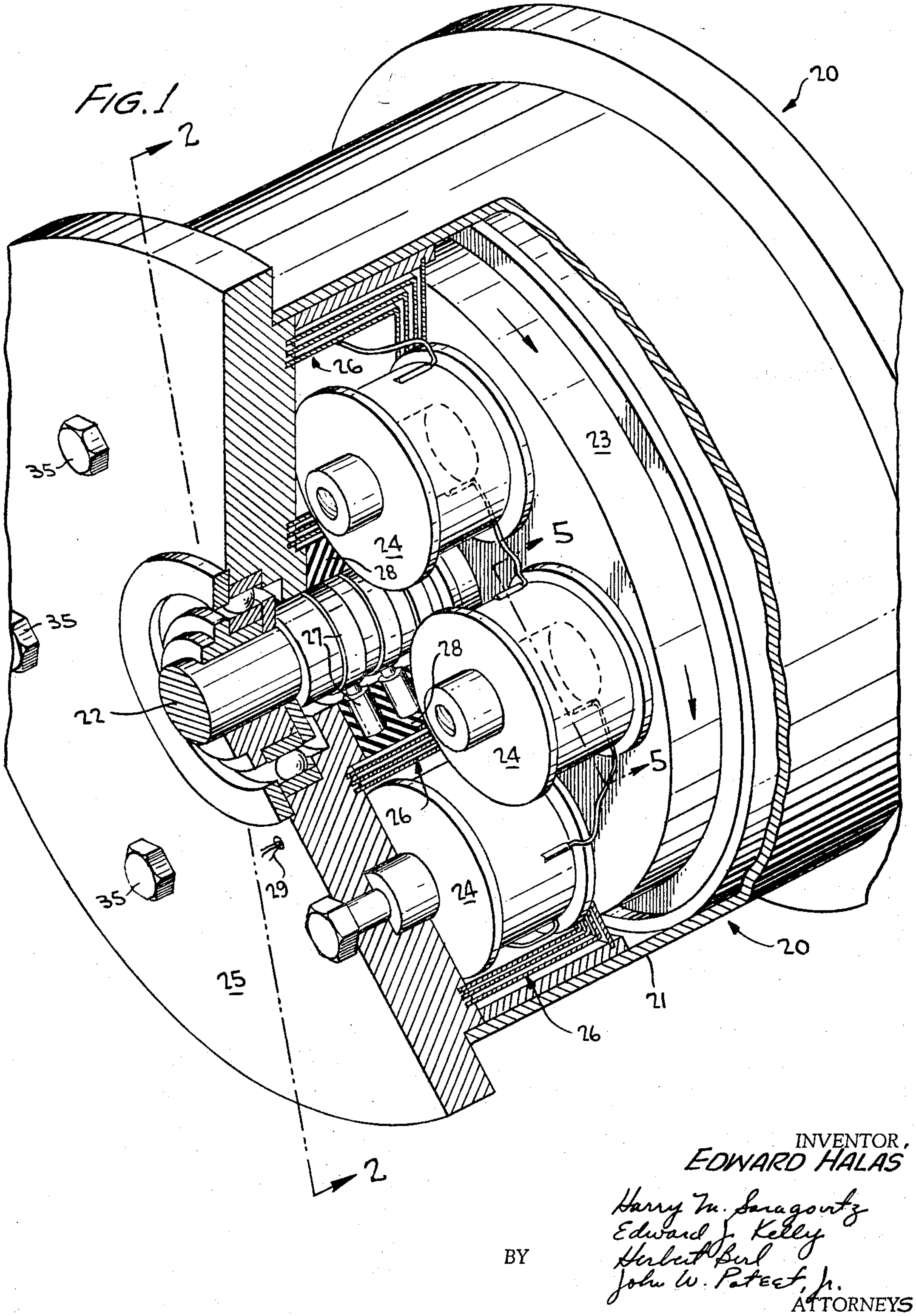
FIG. 1 is a perspective view of one embodiment of this invention.

FIG. 1 shows a superconducting generator 20 with an outside support wall 21. A shaft 22 is located centrally thereof and is rotatably mounted on bearings not shown. Rotor 23 is mounted on the shaft 22 to rotate therewith and is located centrally in said generator.

Within the supergenerator are superconducting coils 24, shown as a pair of thin film coils. These coils 24 are sealed to their wall 25 and are located around said shaft in the vicinity of rotor 23. The superconducting coils 24 are isolated in Dewar enclosures 26.

Slip ring means 27 are provided shaft 22 and support 28 to deliver the output voltage to output leads 29.

The structure shown in cutaway is duplicated on the other side of the rotor 23.

Figure 2:
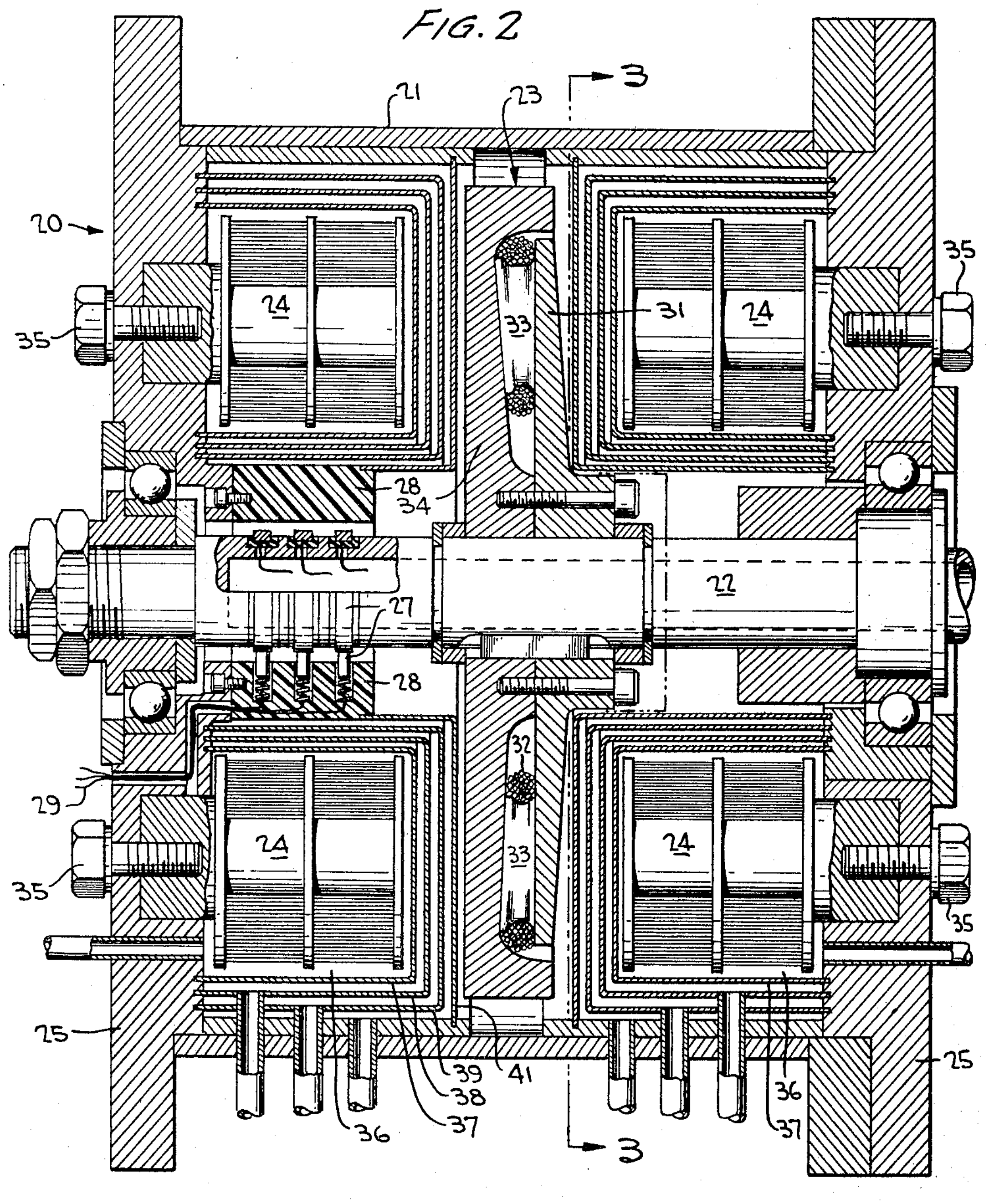
FIG. 2 is a sectional view of the embodiment shown in FIG. 1 as indicated by lines 2—2 in FIG. 1.

FIG. 2 shows the superconducting generator 20 and a plan sectional view. The rotor 23 is shown centrally located with its winding base member 31 with windings 32 supplied on the coil forms 33. Coverplate 34 completes the rotor of this invention. The rotor may be made of epoxy resin materials or any other non-magnetic material. The rotor 23 is sealed to the shaft 22 to rotate therewith. A source of torque power is supplied to shaft 22 to rotate the rotor windings—the connections to the rotor windings are made centrally through the shaft as shown, but can be provided by any conventional means. The slip ring structure 27 is one of the methods whereby the output power can be delivered to output leads 29. The superconducting coils 24 are supported on the end walls 25 by a suitable sealing means 35. The coils 24 are submerged in liquid helium in chamber 36.

Surrounding helium chamber 36 is a wall 37. A second wall 38 is provided. Between walls 37 and 38 is a vacuum chamber. A third wall 39 surrounds wall 38 and provides a chamber therebetween which is filled with liquid nitrogen to provide a liquid nitrogen shield. In the drawings, wall 25 is shown as a part of the structure and part of the thermal insulation embodiment. It is possible that the insulating chambers can completely enclose the superconductor coil 24 and not make use of side 25 in the thermal circuit. The outer wall 41 provides a vacuum chamber with wall 39. The several walls which provide the chambers are constructed in annular rectangular shaped concentric cylinder as shown can be constructed to encase the conducting coils 24 individually. The conducting coils are placed on both sides of the rotor 31 with the polarity on the one side being complementary with the superconducting coil on the opposite side of the rotor 31. The geometry of the structure on both sides of the rotor 31 is identical.

The optimum separtion of the opposed superconductor coils 24 occurs when the mean coil radius equals the distance between the centers of axially opposed superconductor coils 24. The exceptionally strong magnetic fields produced by these coils enables efficient generation of power with less than the optimum spacing. Efficient operation of this generator accomplished without the incorporation of magnetic materials formally used to carry magnetic flux. Large air gaps are possible with superconducting coils and conventional coils. However, in application where desired for specific purposes, magnetic materials can be supplied.

The superconducting generator of FIGS. 1 and 2 generates a voltage in a conventional manner with the armature rotating within exceedingly large magnetic flux produced by superconducting coils 24. The current in superconducting coil 24 is introduced from an external source in order to energize the field of the generator. This current will continue as long as cryogenic temperatures are maintained.

Figure 3:
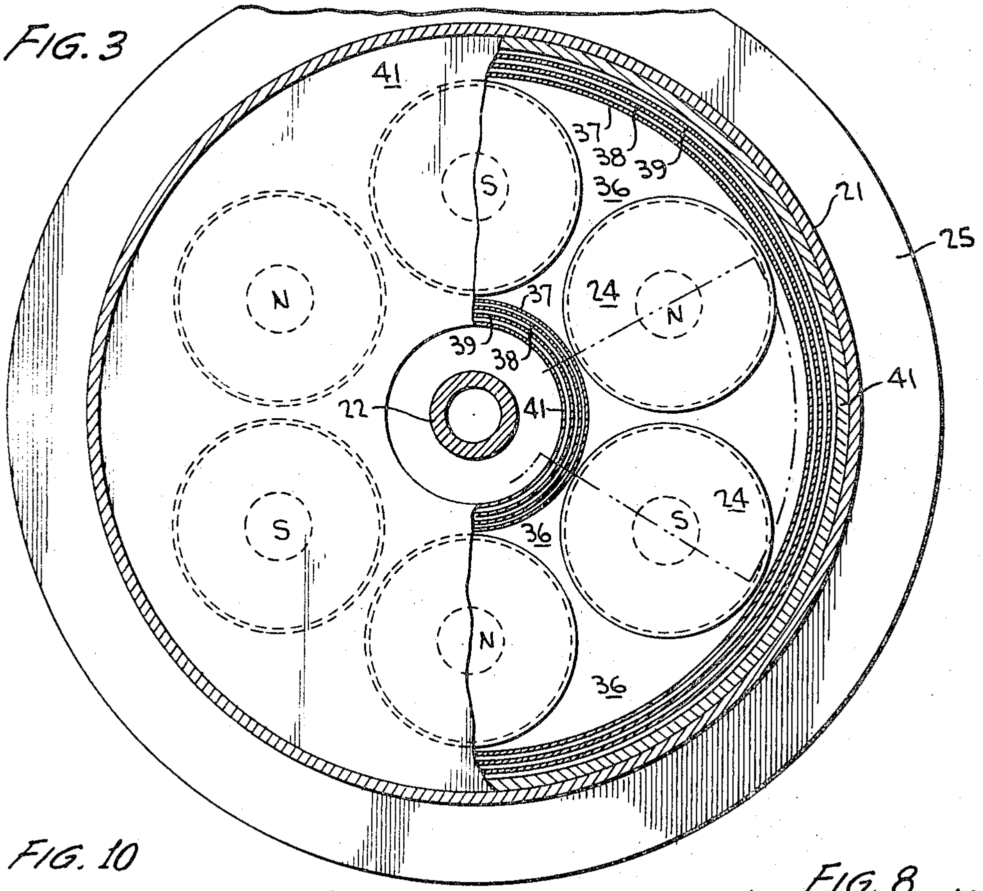
FIG. 3 is a sectional view as seen on lines 3—3.

FIG. 3 is a showing of the geometry of the superconducting coils 24 as viewed along lines 3—3 in FIG. 2. It is to be noted adjacent coils 24 have alternate polarity. The liquid helium 36 is available to all of the coils 24 within chamber wall 37. The vacuum chambers and the liquid nitrogen chamber are shown also.

Figures 4, 5, 6:
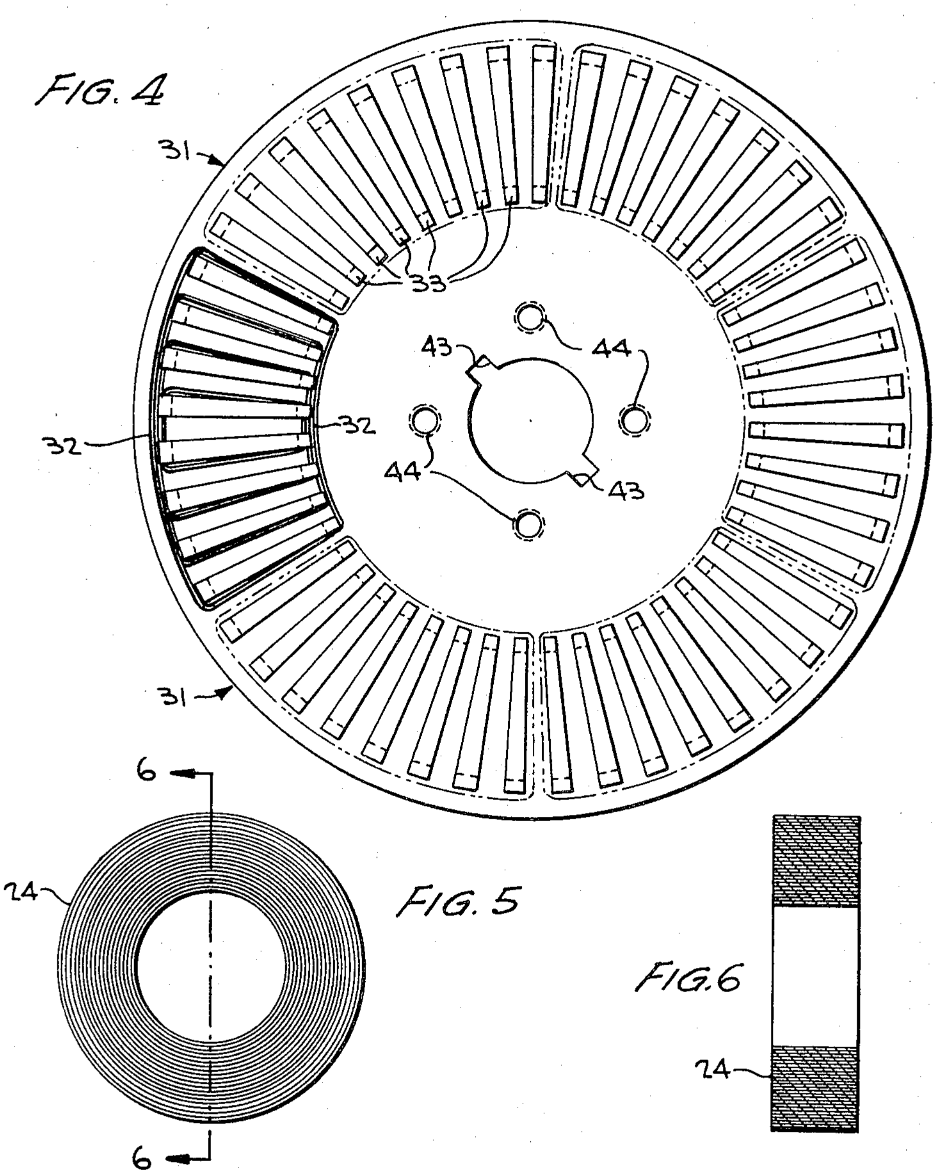
FIG. 4 is a view of one section of the rotor as viewed on lines 4—4 in FIG. 2.
FIG. 5 is a showing of a superconducting coil as shown by line 5—5 in FIG. 1.
FIG. 6 is a sectional view of the superconducting coil as shown by line 6—6 in FIG. 5.

FIG. 4 shows the portion 31 of rotor 23 on which the wires are wound. Coil forms 33 are shown radially from the center of the armature 31. The windings 42 are partially shown in place on the coil forms 33. The configuration of the winding of the armature is dictated to by conventional principles known in the art. Key ways 43 are used to secure the armature to the shaft 22. Apertures 44 provide access for securing the armature cover 34, as shown in FIG. 2, to armature 31. The material is Fibreglas reinforced epoxy. The armature should be a light weight, have high tensile strength, be non-corrosive, and not have to be of a magnetic material. It is designed for structural purposes only, that is, it is not a part of the magnetic circuit.

FIGS. 5 and 6 show the thin film superconducting coil configuration that can be employed in this invention. This coil has exceptional magnetic properties, it provides the exceptionally strong magnetic field for the superconducting generator. The field strength produced by this coil is magnitudes greater than that produced by prior coils. The efficiency effected by this coil is indeed high because of the high magnetic field produced and by the practically zero power loss in the cryogenic operation. This superconducting coil is more thoroughly discussed in my co-pending application referred to previously in this specification.

Figure 7:
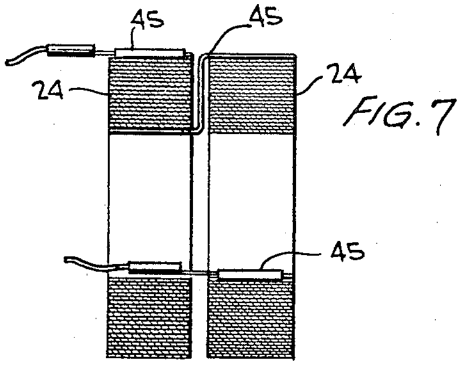
FIG. 7 shows the interconnection of stacked superconducting coils.

FIG. 7 shows the series coupling of adjacent thin film coils. It is noted that the external connection to the coupled coils is secured to the outside end of the left shown coil 24 and from the inner end of the left shown coil to the outer end of the righ shown coil. The external circuit is completed from the inner end of the right shown coil.

Figure 8:
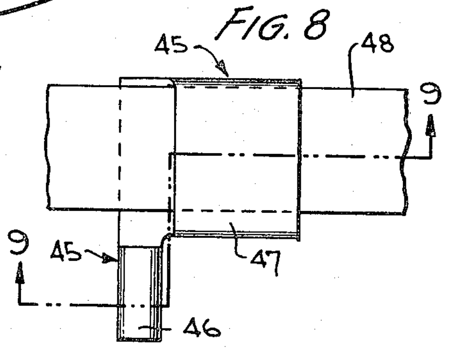
FIG. 8 shows superconducting coil connecting means.
Figure 9:
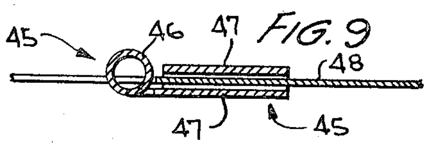
FIG. 9 is a sectional view as seen on line 9—9 in FIG. 8.

FIGS. 8 and 9 show the details of a connector 45 as used in FIG. 7 to connect wires to superconducting tape. The wire lead can be connected into the circular section 46 and secured by soldering or crimping. The connector 45 has a flat envelope 47 which maintains surface contact with the conducting tape 48, such as is used in coils 24. The flat envelope 45 is also connected by crimping and soldering or both.

Figure 10:
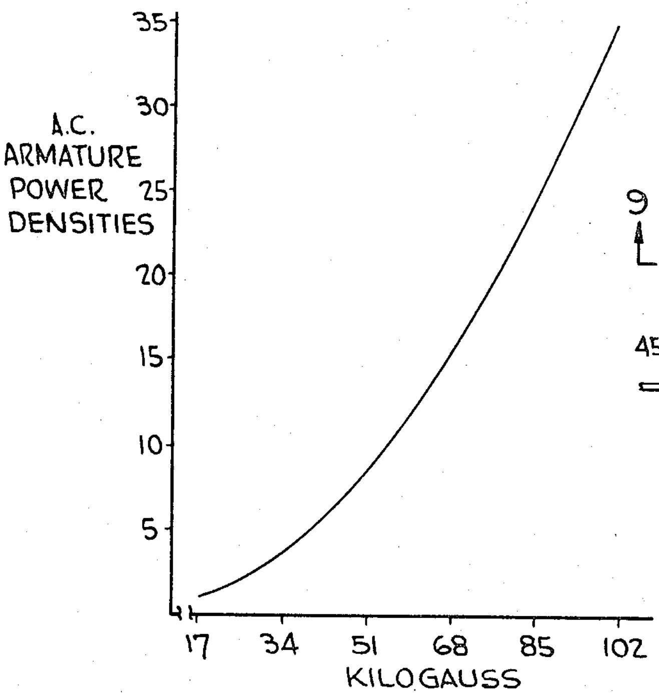
FIG. 10 is a graphic showing of the relationship of power density to magnetic induction with conventional generators having a power density of 1.

FIG. 10 is a graphic showing of the avoidance of the limitations which were formerly imposed by the flux carrying materials of conventional generators. For conventional generators the alternating current power density is taken as 1. When the iron in the armature was saturated, no higher power densities could be obtained. With the present invention it is possible to obtain higher power densities because no such saturation exists. It is seen that by increasing the flux that the power density can continue to be increased to several magnitudes beyond that obtained by conventional generators.

Figure 11:
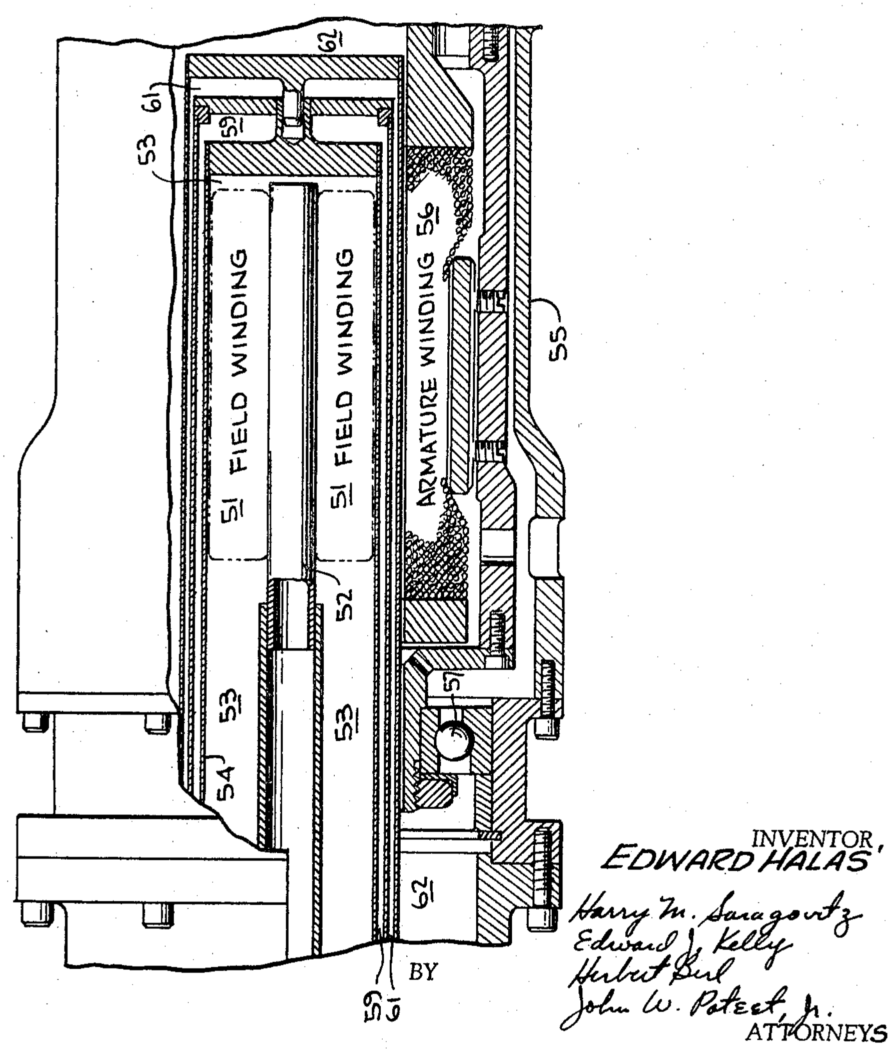
FIG. 11 is a cutaway view to another modification of this invention.

FIG. 11 shows another species of the superconducting generator of this invention. The field winding 51 is provided on a stationary shaft 52 which is secured externally of the liquid helium chamber 53 confined within walls 54. The outer casing 55 is likewise secured to be non-rotatable as is the field winding 51. Within outer case 55 armature 56 rotates on bearings 57, including additional bearings circumferentially of the armature 56 at both ends thereof, not shown. Current collector means 58 such as the searing types shown, are provided on the rotating armature shaft for delivering the output voltage to output terminals. The Dewar structure including vacuum chambers 59, liquid nitrogen chamber 61 vacuum chamber 62 are shown with the field winding being the only structure maintained at the cryogenic structures. My remaining structure is in ambient temperature environment.

Mobility and performance are prime requirements for military ground based generation equipment. Military electrical consumption has been on the increase for a number of years and projected requirements show a continuing increase. The trend is towards high power density generators that are efficient and light weight for field use. Lightness is essential since it reduces the logistic problem associated with a moving army. It is obvious that equipment light enough to be carried by individual men under special conditions enhances usage of the equipment considerably. Recent research and development with superconducting materials indicates that superconducting electrical generators offer excellent possibilities to meet these objectives of efficiency and mobility.

*Recent developments*

Superconducting material developments in the past three years have opened the door to the design of very high power density generators. Although the knowledge of superconductivity has been with us for 53 years, it was not until the discovery of hard superconducting materials, such as niobium-tin that the technical applications could even begin. Mercury was discovered to be superconducting in 1911. A short time afterwards, tin, lead, indium, were discovered to have superconducting properties. These materials have since become known as soft superconductors. Generally they are characterized by being single metals and not alloyed. The soft superconductors are limited in the magnitude of the superconducting fields and currents that can be attained. The major advancement in recent years was the discovery of hard superconducting materials such as niobium-tin which permit the efficient attainment of very strong magnetic fields from physically small coils.

It was in 1961 that a high field niobium-tin material was reported at 88 kilo-gauss. Since that time attainable steady state field strength has continued to increase.

The superconducting status today is in a point which requires more effort and expenditure to be directed in superconducting coil engineering and improvements in the processes to produce substantial quantities of superconductors at lower prices. It would be well to point out that the raw material cost of niobium is about $44.00 per pound and tin usually runs about $1.00 per pound. The raw materials for niobium-tin costs about $33.25 per pound. At the present time processing costs exceed the material costs to produce relatively small quantities used for research.

*Unit sizes and prime movers*

As might be expected, the largest requirements for mobile generators are in the smaller sizes, beginning at 5 kw. and running through 50 and 100 kw. units. Subsequently, the most useful superconducting generator designs are those which can be adaptable to these power ranges and also satisfy a number of other requirements such as performance at sub-zero temperatures, reliability, low maintenance, and versatility with available prime movers.

Generator designs are greatly influenced by the prime-mover being used. For example, a generator built for a steam turbine is quite different from one built for use where water is the prime mover. The two prime movers which are the most acceptable with portable generators are reciprocating engines and gas turbines. Since both are popular and will continue to be for a long time, it is advantageous to have versatile generators which can be utilized with both types.

*Normal generators and superconducting generators*

In normal electrical generator design, it is common practice to construct machines to work at the highest possible flux densities to obtain the highest attainable power density for any given machine size and weight. The flux density explanation is not all there is to design, as experience and sound judgment are necessary to balance correctly all the many variables in a successful commercial design. However, in a well-balanced conventional magnetic circuit, the flux density is from 15,000 to 21,700 gauss. Generators designed below and above this range are generally larger than they could be for maximum utilization of materials. Experienced designers can estimate fairly accurately the building cost of generators by the magnetic field utilization factor.

With superconductor coils it is now possible to design generators with considerably stronger fields than are attainable with conventional materials. Using this approach a number of new advantages can begin to take form. The theoretical power density is related to the flux density by a square factor. For example, for twice the utilized flux density the power density is four times, for three times the flux density the power density is nine times, etc. The maximum theoretical power densities will not be achieved because of other considerations, but large magnitude improvements are possible with good designs. A superconducting generator would no longer need an excitor generator to power the field and thus would eliminate additional size, weight and moving parts.

*Cryogenic field coil enclosure*

Superconducting field coils have to be kept at cryogenic temperatures to perform properly. For small size generators, a refrigerant such as liquid helium would be satisfactory, with periodic replacement as required. The heat loss from the refrigerant can be greatly reduced by the use of an efficient thermal enclosure.

There are three types of thermal enclosures in use today. These are:

(a) A double walled vacuum thermal enclosure in which the wall surfaces are coated to provide a low emissivity surface.

(b) A double walled enclosure as in (a) but with the addition of a liquid nitrogen shield placed between the two walls. This construction is known as a Dewar. The use of the liquid nitrogen shield is effective in reducing the liquid helium vaporization by using more of liquid nitrogen which is more economical and has a greater cooling capacity.

(c) A double-walled vacuum enclosure as in (a) but with the addition of multiple insulation layers to provide many reflecting surfaces to minimize radiation to a large degree and restrict the heat loss from the refrigerant. This type of insulation has the largest wall dimension but has advantage in using only one cryogenic refrigerant. The unit can be made fairly light weight, however.

*New superconducting generator concept*

The technology of superconducting materials and coils is at the stage today where this new knowledge is ready for application to high power density highly mobile generators to supply growing electrical ground support requirements.

Just as in the early days of generator development, the practical designs had to make intelligent use of available materials and techniques; today the same approach has to be taken with superconductor generators. Since every new generator design has to be something of a compromise between performance, weight, and economics, it has never been possible to satisfy all requirements perfectly. However, it is always good logic to accept a substantial generator improvement when it becomes possible to obtain it.

FIGURE 10 shows the advantage to be gained through the use of strong superconducting fields at the alternating current armature.

FIGURE 2 introduces an original new superconducting generator concept. This is an inductor generator type. The superconducting field is stationary, and the normal armature rotates in the field. This is a new construction which can efficiently utilize the strong magnetic fields obtainable from superconducting coils. There are no massive magnetic circuits. A separate generator to excite the field is not needed. The rotor is a high speed disc type construction. The armature construction makes use of flat sheet conductors which can withstand the high compressive forces caused by centrifugal loading without short circuiting of conductors. For example, the insulation cut-through problems and conductor movements are controlled by the use of flat sheet conductors which provide even mechanical force distributions over the electrical insulation. This new technique will provide the needed mechanical integrity to safeguard the electrical performance and reliability. The heat transfer for the disc type construction provides a large surface area to mass ratio. For very effective heat transfer from the rotor, the rotor is an aerodynamic construction to allow turbulent air flow around the disc rotating in free air. Designing the rotor for self cooling and not requiring a special fan design is a further advantage in reducing windage loss.

The rotor construction is a hyperbolic disc profile with a smooth external surface. The hyperbolic design allows maximum usage of the tensile strength properties of the rotor material. The lightest weight structures are generally made by utilizing the material properties in tension. For example suspension bridges make maximum usage of this principle.

It is possible to use a number of different materials for the rotor construction. Since the magnetic fields are beyond the range of saturation of magnetic materials, the material selection must be made for the structural properties, light weight, heat transfer and other features. For small size generators it would be possible to mold a glass fiber reinforced epoxy resin rotor having a high strength to weight ratio. This would have additional advantages of resistance to moisture, corrosion and vibration. Actually a large number of modern materials are available for advantageous use in this application.

This superconducting generator requires use of current collectors to draw the power from the rotor. The slip rings are smooth and of small diameter. Making use of the latest developments, the current collectors would be of a high speed electrographic grade with the incorporation of molybdenum disulphide plugs. Generally dust covers are provided over the current collectors to keep them clean in operation.

*Alternator generator and inductor generator*

It would be well to point out the difference between an alternator generator and an inductor generator as these terms refer to two basically different generators. The alternator-generator is the best known. It is identified by alternate north and south poles successively on the rotor. This alternating pole construction has enabled maximum use to be made of magnetic steels at low frequencies and rotating speeds. The harmonics generated are predominately odd harmonics. The inductor generator is used mainly with gas turbine engines at high rotating speeds and high frequencies. This type generator is used because of the inherent high mechanical integrity. The rotor construction is such that it does not have alternating poles to produce an alternating north and south pole flux but rather a pulsating flux which does not change polarity. This pulsating flux generates even, odd and steady state harmonics. Only the fundamental odd harmonic is useful in generating voltage. The even harmonics are neutralized in the windings and the steady state component does not develop any voltage. An alternator generator with four projections on the rotor is a four pole generator. An inductor generator with four projections on the rotor is an eight pole generator.

*Normal conductors and superconductors*

A normal conductor has a resistance to the flow of electric current which is usually stated in terms of ohms. The normal resistance is influenced by the metal, cross-section area, length, and temperature. Also dynamic conditions as tension and torsion will change the normal resistance of a conductor. As the temperature drops to cryogenic temperatures the conductor normal resistance continues to drop until it reaches a residual resistance at absolute zero temperature. At cryogenic temperatures something happens to conductors in the influence of a magnetic field. A new resistance phenomena takes place—called magneto-resistance. While the normal resistance of a conductor decreases with lower temperatures, the magneto-resistance increases with lower temperatures. This magneto-resistance does not occur unless the conductor is in a magnetic field. Also the magneto-resistance of a conductor increases as its influencing magnetic field increases.

The other discovery was that some conductors had zero normal resistance at temperatures much higher than the absolute zero. The temperatures at which this happens is called the critical temperature. These conductors became known as superconductors because large currents could flow through them without power loss. However, while such conductors possessed no normal resistance they did possess magneto-resistance and were influenced by magnetic fields similar to normal conductors. While decreasing temperatures cause increasing magneto-resistance in normal conductors, the effect is not the same in superconductors. Below the critical temperature of a superconductor, decreasing temperatures cause decreasing magneto-resistance. The total magneto-resistance of a superconductor is influenced by the temperature and the strength of the magnetic field. There are engineering techniques available to optimize the performance of a superconductor, but consideration of field strength and temperature are important factors. As mentioned, the first superconductors were singular metals such as mercury, lead, tin. These did not become popular because they possessed very high magneto-resistance.

In recent years the discovery of binary metal superconductors with low magneto-resistance and much higher critical temperatures have opened the commercial possibilities for engineering application to generators. Today we possess a much better understanding of the engineering of superconductor coils and the optimization techniques. The transition is then from small experimental coils to larger working coils on working applications. We have today the materials and techniques to develop new generators that will provide more mobility for the required utility. In standard practice a good engineering knowledge of normal resistance effects in coil design was necessary. Once again, but now at cryogenic temperatures, the same type of skillful knowledge of magneto-resistance is required to understand optimum superconductor coil design techniques.

*Advantages of superconducting generators for support equipment*

Reduction in size and weight are the potential advantages of superconductor generators. The date at which these new generators will become available for field application is determined by the level of funding effort and the contracts awarded to build larger units. The initial research and development work on superconducting coils and generators have produced many very useful results. We can be certain that with development emphasis, superconducting generators can be built utilizing the new cryogenic materials and the strong fields. In this respect generators will have that new look with a vastly increased performance to pace the growing needs of increased power requirements in mobile field applications.

Obviously many modifications and variations of the present invention are possible in the light of the above teachings. It is therefore to be understood, that within the scope of the appended claims, the invention may be practiced otherwise than as specifically described.

What is claimed is:

1. In an armature, a disc means, wire form means, said wire form means positioned radially on said disc means, shaft receiving means positioned centrally of said disc, keying means cooperating with said shaft receiving means for securing said disc to said shaft, said disc being constructed of non-magnetic materials.

2. The armature of claim 1 including a cover plate which is secured to said disc means to cover said wire form means.

3. In a superconducting generator, encasement means, bearing means mounted on said encasement means, shaft means mounted in said bearing means, armature means mounted on said shaft means, means for securing said armature means to said shaft means to rotate therewith, said armature means being constructed of non-magnetic materials, a plurality of thin film superconducting coil means, said coil means mounted on said encasement means circumferentially of said shaft means, pairs of said coil means axially aligned on opposed sides of said armature means, insulation means for isolating said coil means at cryogenic temperatures, said insulation means encasing said coil means, cryogenic fluid in said insulation means for immersing said coil means, output means, and means for conducting the output voltage of said armature connected between said armature and said output means.

4. In a superconducting generator, an encasement means, an armature means rotatably mounted in said encasement means, having a tubular central aperture therein, insulation means positioned within said aperture in said armature means, a superconducting field winding means positioned within said insulation means, said insulation means filled with cryogenic fluid to saturate said field winding means, said insulation means and said field winding means being fixed with respect to said encasement means.

References Cited

UNITED STATES PATENTS

| | | | |
|---|---|---|---|
| 2,945,207 | 7/1960 | Duks | 339—276 |
| 3,005,117 | 10/1961 | Buchhold | 310—40 |
| 3,239,697 | 3/1966 | Stekly | 310—11 |
| 3,242,418 | 3/1966 | Mela | 310—40 X |
| 3,289,019 | 11/1966 | Buchhold | 310—52 |
| 3,320,443 | 5/1967 | Klein | 310—11 |

MILTON O. HIRSHFIELD, *Primary Examiner.*

D. X. SLINEY, *Assistant Examiner.*